US009292099B1

(12) United States Patent
Cole

(10) Patent No.: US 9,292,099 B1
(45) Date of Patent: Mar. 22, 2016

(54) THUMBS-FREE COMPUTER KEYBOARD

(71) Applicant: Carol Lynn Cole, Seattle, WA (US)

(72) Inventor: Carol Lynn Cole, Seattle, WA (US)

( * ) Notice: Subject to any disclaimer, the term of this patent is extended or adjusted under 35 U.S.C. 154(b) by 0 days.

(21) Appl. No.: 14/567,302

(22) Filed: Dec. 11, 2014

(51) Int. Cl.
*G06F 1/16* (2006.01)
*G06F 3/02* (2006.01)

(52) U.S. Cl.
CPC .................... *G06F 3/0216* (2013.01)

(58) Field of Classification Search
CPC ........................................ G06F 3/0216
USPC .................................... 361/679.08
See application file for complete search history.

(56) References Cited

U.S. PATENT DOCUMENTS

| | | | | |
|---|---|---|---|---|
| 4,067,431 A | * | 1/1978 | Whitaker | B41J 5/10 341/27 |
| 4,655,621 A | * | 4/1987 | Holden | G06F 3/0235 341/20 |
| 5,971,636 A | | 10/1999 | Mensick | |
| 6,529,186 B1 | | 3/2003 | Thayer | |
| 2005/0186005 A1 | | 8/2005 | Maeda | |

\* cited by examiner

*Primary Examiner* — Anthony Q Edwards
(74) *Attorney, Agent, or Firm* — Mohr Intellectual Property Law Solutions, PC

(57) ABSTRACT

The thumbs-free computer keyboard is a computer keyboard having circuitry to detect user input and to communicate data corresponding to such user inputs. Thumbs-free computer keyboard includes depressible keys that are supported by the keyboard body and in data communication with the circuitry. The depressible keys are laid out in a modified QWERTY configuration and positioned such that a user does not have to press any keys with his thumbs. The modified keyboard configuration includes increased space between the G and H keys. An input device that works in place of the traditional space bar is disposed within the increased space between the G and H keys, such that when a user activates the input device, a space bar function is communicated to the computer. In some examples, the input is one input device, while in other examples, two input devices are described. One or more input devices are placed in locations on the keyboard that are least disruptive of conventional typing.

20 Claims, 12 Drawing Sheets

US 9,292,099 B1

THUMBS-FREE COMPUTER KEYBOARD

BACKGROUND

The present disclosure relates generally to keyboards for use with computers and other computing-related devices. In particular, keyboards where the user can choose not to use her thumbs when typing are described. More particularly, the present disclosure relates to a thumbs-free keyboards that allow a user to access the space bar function without depressing the space bar with her thumbs. Instead, the keyboards described below allow a user's thumbs to be in a relaxed position while she activates the space bar command by means other than with his thumbs.

Persons afflicted with degenerative arthritis of the thumb carpo-metacarpal (CMC) thumb joint experience considerable pain in the joints of the thumb. Osteoarthritis of the thumb increases with age, and is more common among women. Persons afflicted with this condition experience aching pain at the base of the thumb as well as weakness, clumsiness, or even deformity of the thumb. Osteoarthritis of the thumb may be caused by trauma or injury, as well as repetitive stress or motion over long periods of time.

Many present day activities exacerbate osteoarthritis of the thumbs. Repetitive motions such as striking the space bar of a keyboard while typing and gripping the mouse greatly aggravate osteoarthritis of the thumbs. Also, not only is the society of today more dependent on using computers than ever before, we are taxing our thumbs more than ever with the use of mobile phones where the thumbs are the primary actuators of the touch screen. Thus, the increased use of our thumbs in everyday typing and with the additional use of mobile devices, along with decades of repetitive use, will likely bring about more injuries of this type in the near future.

Currently there are no keyboards on the market that offer a thumbs-free feature for using a computer keyboard. Having a keyboard where the thumb is allowed to rest would greatly help those with pain associated with osteoarthritis of the thumb use a keyboard more comfortably. A thumbs-free keyboard can also give those that do not yet have a serious thumb injury a way to minimize such injuries of the thumb.

It would be desirable to have a thumbs-free keyboard where a user may simply rest his thumbs on the bar where the space bar is located on a conventional keyboard without concern that she is inadvertently adding spaces to the project a user is working on. It would also be desirable to have an alternative means of actuating the space bar function with reasonable ease. The alternative method for activating the space bar should not contort the fingers of the users and should be something that a user could easily become accustomed to without much training. An effective alternative to the space bar should not require the user to look down at the keyboard to search for the space bar alternative or to confirm that the correct key is being activated.

Existing keyboards do not adequately address the issues discussed above. For example, U.S. 2005/0186005 to Maeda is for a QWERTY keyboard that allows a user to place his thumbs on protrusions from the spacebar when in the neutral position making it easier for the user to keep a base position of his fingers when typing. The keyboard design of Maeda still requires the user to use the space bar as the only way to prompt a space bar function.

U.S. Pat. No. 6,529,186 to Thayer is a computer-based method that uses the index finger to control and manipulate a keyboard without moving the fingers away from the "home row" of keys of a computer keyboard. The invention in Thayer uses the "J" key to effectuate other key functions on the keyboard such that there is less strain on the user's hand, but still involves a user using his thumbs to engage the space bar.

Finally, U.S. Pat. No. 5,971,636 to Mensick is for a keyboard arrangement that integrates ergonomic modifications. The '636 patent attempts to provide a more ergonomic position for the entire hand and does not attempt to avoid using the thumbs of the computer user to use the keyboard. Thus, there is a need for a computer keyboard layout that allows a computer user to type without needing to use his thumbs.

SUMMARY

The present disclosure is directed to a thumbs-free computer keyboard. The thumbs-free computer keyboard is a computer keyboard having circuitry to detect user input and to communicate data corresponding to such user inputs. Thumbs-free computer keyboard includes depressible keys that are supported by the keyboard body and in data communication with the circuitry. The depressible keys are laid out in a modified QWERTY configuration and positioned such that a user does not have to press any keys with his thumbs. The modified keyboard configuration includes increased space between the G and H keys. An input device that works in place of the traditional space bar is disposed within the increased space between The G and H keys, such that when a user activates the input device, a space bar function is communicated to the computer. In some examples, the input is one input device, while in other examples, two input devices are described. One or more input devices are placed in locations on the keyboard that are least disruptive of conventional typing.

DETAILED DESCRIPTION

The disclosed thumbs-free computer keyboard will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various layouts of the thumbs-free keyboard are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

A thumbs-free keyboard, as the name suggests, is a computer keyboard that allows a user to easily type without the need to use either of the thumbs of the user. The space bar function as it is used on a conventional QWERTY keyboard may be diverted to one or more input devices located on the thumbs-free keyboard. Three main layouts of the thumbs-free keyboard will be described below and allow a user to type with minimal deviation from the conventional QWERTY key placement. By only slightly altering the placement of the keys, a user will quickly and easily grow accustomed to engaging the input device to activate the space bar command. Finally, placement of the input device corresponds to locations on the keyboard that are easily accessible by a user's fingers without much more reaching than normal typing requires.

Figure 1:
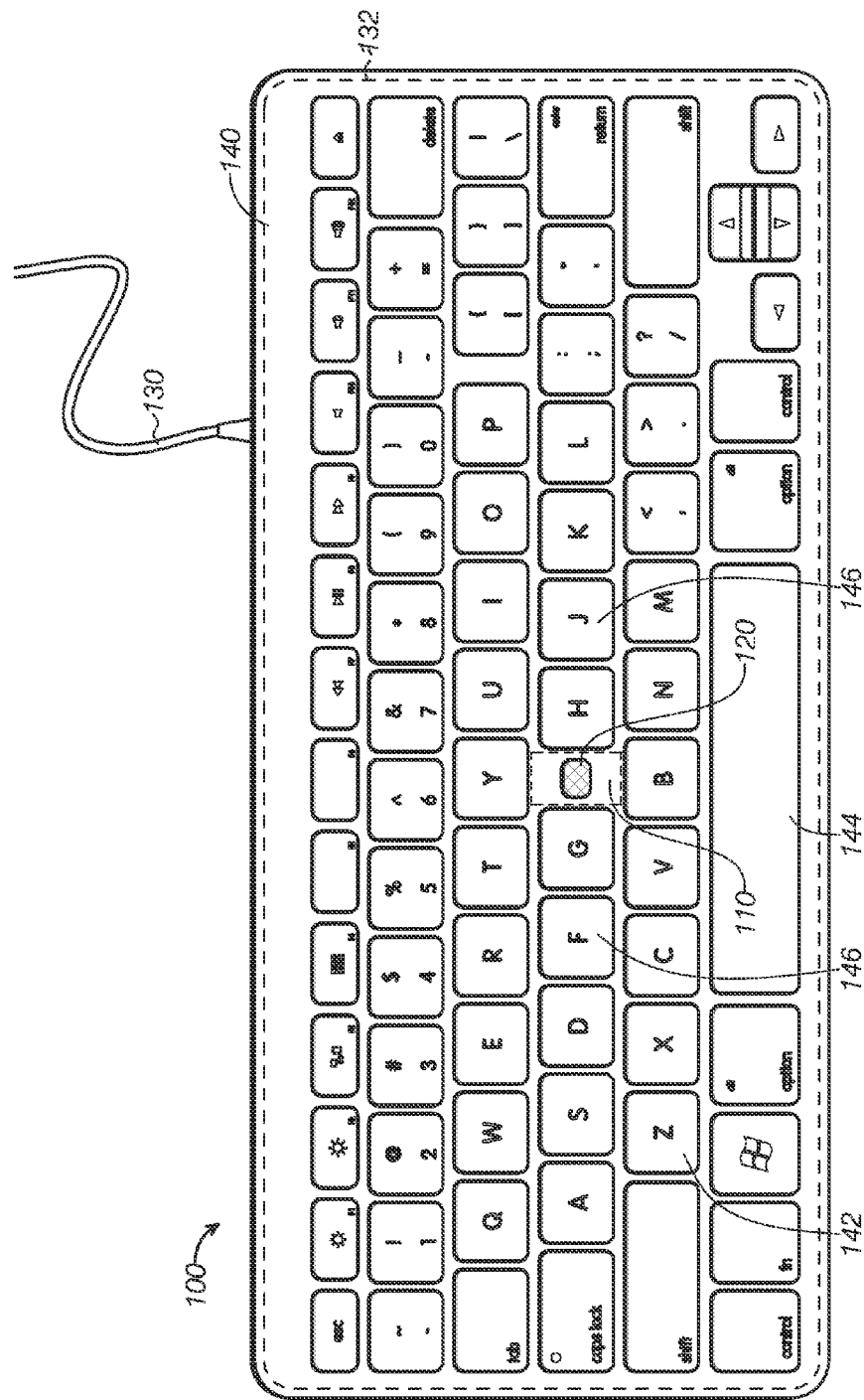
FIG. 1 is a plan view of a first embodiment of the thumbs-free computer keyboard.
Figure 2:
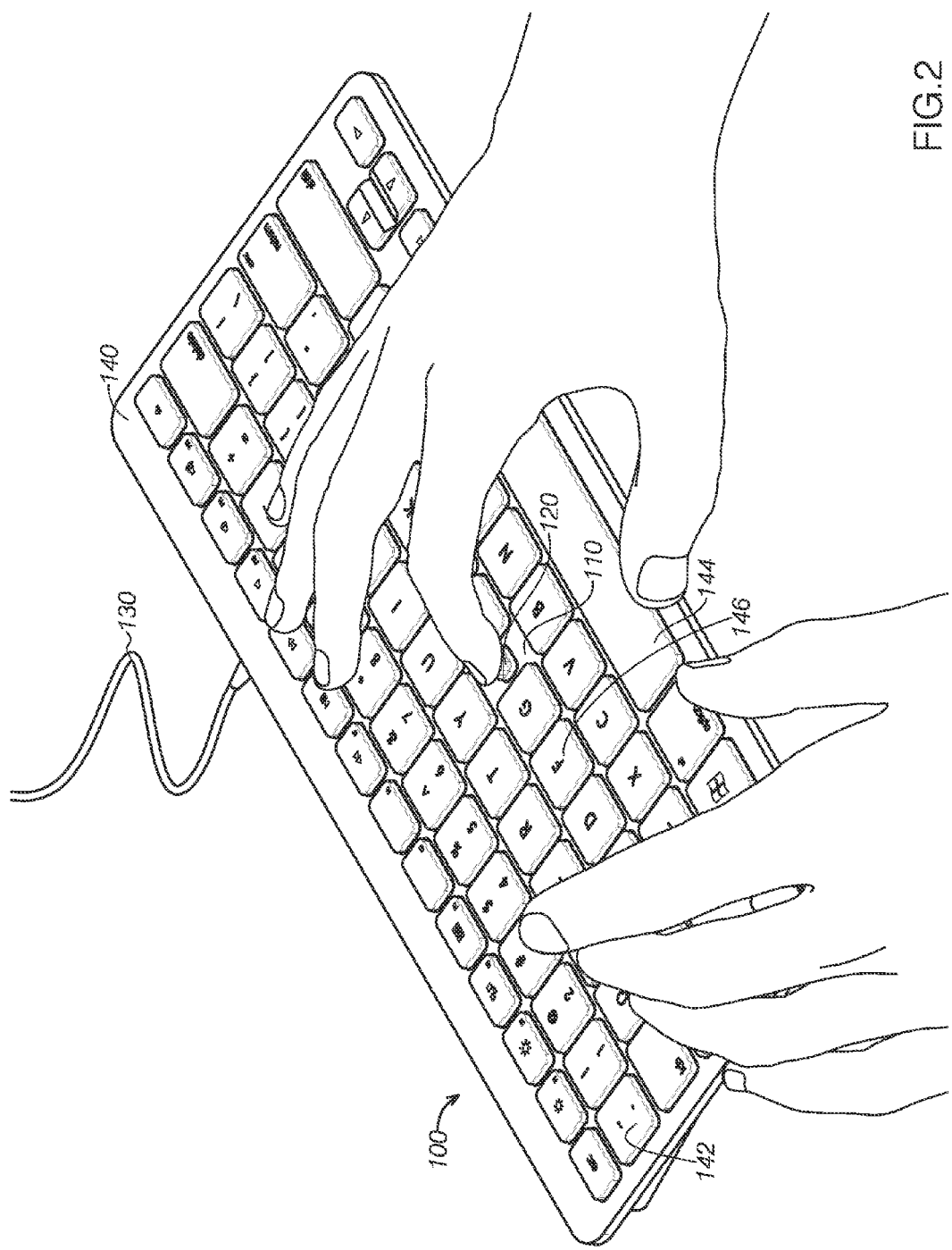
FIG. 2 is a perspective view of the first embodiment of the thumbs-free computer keyboard of FIG. 1 showing a user's hands on keys with one index finger hovered over an input device.

With reference to FIGS. 1 and 2, a first embodiment of a thumbs-free computer keyboard 100 will now be described. Thumbs-free computer keyboard 100 includes relevant circuitry 132, a keyboard body 140, a series of depressible keys 142, an increased space 110, and an input device 120. Thumbs-free computer keyboard 100 also includes a cable 130 that electronically connects thumbs-free keyboard 100 to a computer.

Electronic circuitry 132 provides data communication as necessary for a functional keyboard. Because much of circuitry 132 embodies standard circuitry design for a standard QWERTY keyboard and thus known in the art, the basic electronic circuitry is not laid out in this application in detail. Like circuitry in conventional QWERTY keyboards, circuitry 132 is configured to detect data input from a user that is communicated to the user's computer. Further, circuitry 132 detects when a user depresses depressible keys 142 and communicates these sequences of key depressions to user's computer. Circuitry 132 deviates from standard circuitry by electronically connecting new input device 120 and program the function of input device 120 to indicate a space bar function is sought when input device 120 is activated.

Keyboard body 140 houses the electronic circuitry for thumbs-free computer keyboard 100. Keyboard body 140 further supports depressible keys 142. Keyboard body 140 can be manufactured from a number of suitable materials that are lightweight and sturdy. In some instances, the keyboard body may be rigid while in other cases, the keyboard body may be flexible.

Next, depressible keys 142 are in the same order or layout as a standard QWERTY keyboard layout and thus, include keys that correspond to letters, numeric, and symbolic functions. Depressible keys 142 include all the standard functionality as the keys of a conventional keyboard. In other examples, the depressible keys may be a touch pad with no physical keys to activate.

As the examples in FIGS. 1 and 2 shows, increased space 110 exists between the G key and the H key. Increased space 110 is formed from widening the existing space between certain depressible keys 142. Increased space 110 allows for placement of input device 120. Due to increased space 110, thumbs-free keyboard 100 is proportionately larger than conventional keyboards to accommodate the increased space needed. In other examples, the depressible keys may be proportionately smaller to accommodate increased space within the conventional keyboard size range.

Input device 120 is located within increased space 110. One consideration for placement of input device 120 was ease of use. It was first determined that the index and pinky fingers of a computer user were the two fingers most free to move to a non-conventional key location. It was then decided that, due to the frequency with which the space bar is struck, that the index fingers, compared to the pinky fingers, would be able to better withstand repeated movements in addition to the conventional keys that it would strike. When the user's fingers are in neutral position, his index fingers rest on neutral locations 146, respectively the F and J keys.

In this example of thumbs-free computer keyboard 100, input device 120 is located between the G and H keys such that either right or left index finger could easily reach and interact with input device 120 to communicate to the computer a space bar command without need of the user's thumbs. User can activate a space bar command by depressing input device 120 with either index finger from either neutral location 146.

Thumbs-free computer keyboard 100 has the benefit that because both index fingers reach to activate the same input device 120, increased space 110 does not have to be large. The minimal disturbance of the conventional QWERTY keyboard layout allows thumbs-free computer keyboard 100 to mostly maintain the same dimensions as a traditional QWERTY keyboard, which would be easier and faster for a user to become accustomed to the layout of thumbs-free computer keyboard 100. In other examples, the input device may be located somewhere else on the keyboard such that both index fingers can easily access the input device.

Input devices may be of any shape or size that may be accommodated within increased space 110. Increased space 110 is configured in thumbs-free computer keyboard 100 to allow for placement of one or more input devices. The input device can be a button smaller than the size of the other keys or the same size. Alternatively, the thumbs-free computer keyboard can be larger to accommodate the increased space needed for the addition of the input device.

While the button for input device 120 may be the same size as the other letter, numerical and symbols keys, a smaller and/or different shape may aid a computer user to more easily distinguish input device 120 from other keys in the area. In the present example, input device 120 is rectangular in shape with rounded edges. Input device 120 has a smooth surface texture like the other keys but may also have a different surface texture compared to the smooth texture of most keys on a conventional keyboard. The different surface texture may be advantageous to alert the user that his finger has located the correct key for inputting the space bar function. The different surface texture may be ridges on the surface of the key, small protrusions, or anything that allows the user to know that the surface of the input device is different than the surface of the surrounding keys when touched.

Figure 3:
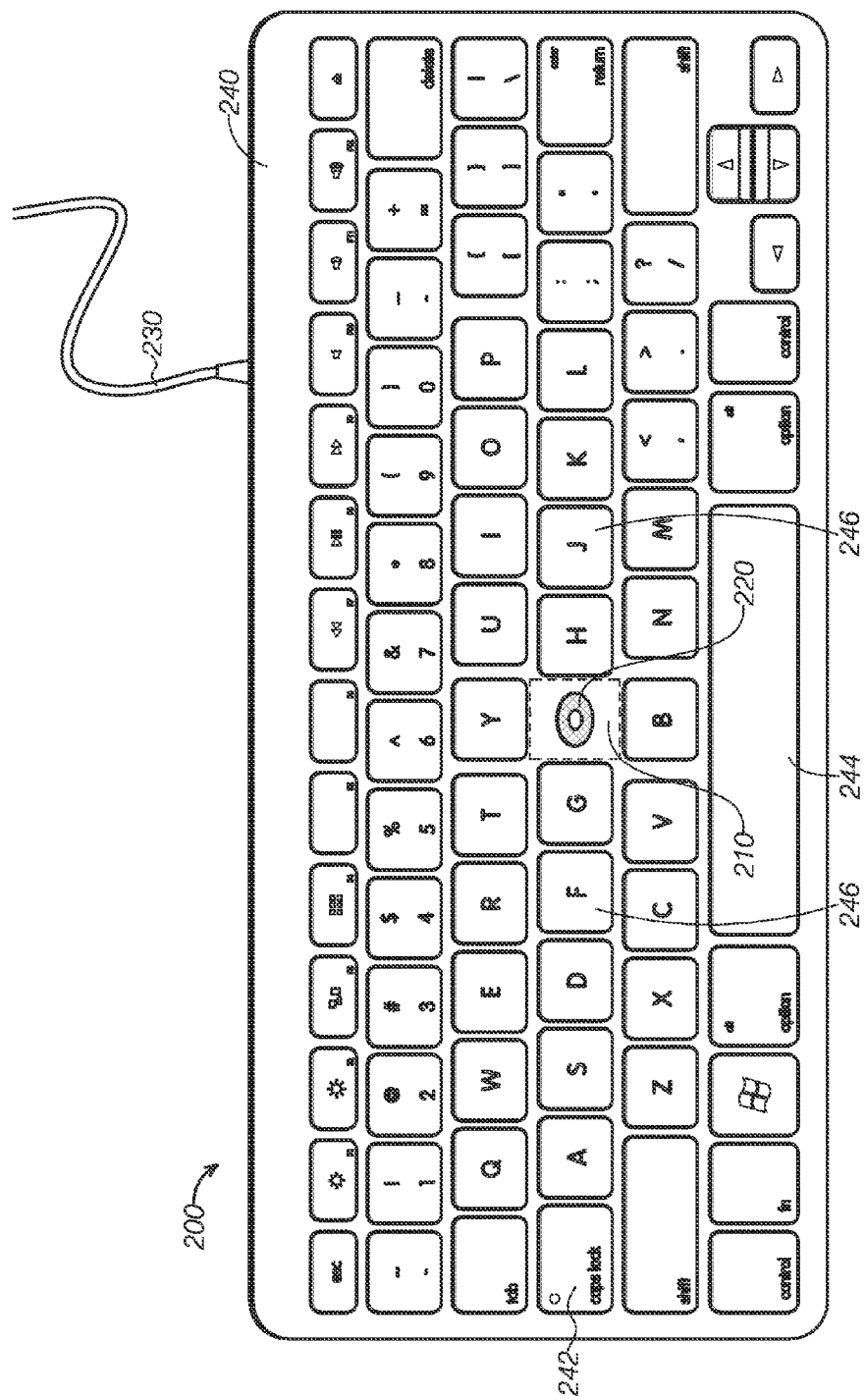
FIG. 3 is a plan view of a second embodiment of the thumbs-free computer keyboard.

In this example, input device 120 is a depressible key. But in other examples, the input device may be one of several mechanisms that allow a user to engage the input device and communicate to the computer that a space command is requested. One possibility as shown in FIG. 3, an input device 220 is a motion sensor. A second possibility is show in FIG. 4 where an input device 320 is a touchpad.

Cable 130 allows thumbs-free computer keyboard 100 to be in both data and electrical communication with the associated computer. In other examples, the thumbs-free computer keyboard is a wireless keyboard and does not require a physical connection between keyboard and the associated computer. Thumbs-free computer keyboard 100 also includes a traditional space bar 144 in a similar location as traditional space bars.

Finally, thumbs-free computer keyboard 100 includes a mechanism (not pictured) for switching space bar function between input device 120 and traditional space bar 144. The mechanism may be a switch located on the keyboard or a setting that can be changed on the computer itself. The advantage of being able to switch actuation of the space bar function between the traditional space bar and input device 120 is that it allows both users that require a thumbs-free device and other users that prefer the traditional keyboard to share one keyboard. Thus, an office or a family need only have one keyboard connected to the computer, where users with and without the need for a thumbs-free keyboard can share the keyboard.

An alternative structure for the input device is that of a motion sensor as shown in FIG. 3. In this second embodiment, thumbs-free computer keyboard 200 would be configured to recognize a pre-determined movement of the user's finger to mean that the user wishes to activate the space bar function. Potential pre-chosen motions can be a swipe of the finger above the sensor from left to right or right to left, an up and down tapping motion, or a series of taps above the sensor.

Figure 4:
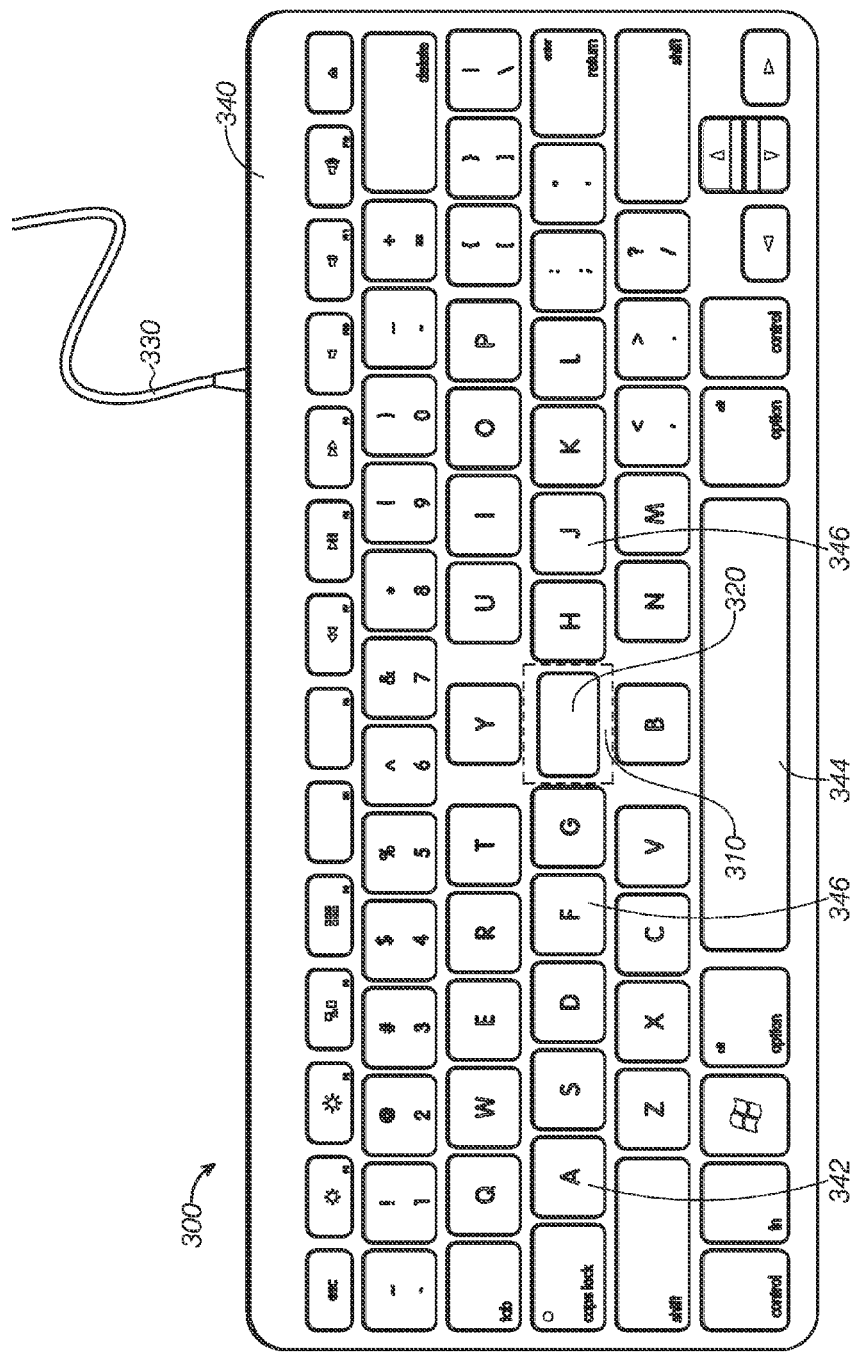
FIG. 4 is a plan view of a third embodiment of the thumbs-free computer keyboard.

A third embodiment for the input device is touchpad 320 as shown in FIG. 4. Touchpad 320 has similar function as motion sensor 220, and would detect a pre-chosen motion pattern to indicate that user wishes to activate the space bar function. Both motion sensor 220 and touchpad 320 have the advantage that both require minimal pressure from a user's fingers to actuate and thus, would lessen the additional strain on user's index fingers associated with using them to activate the space bar function compared to the strains associated with the index fingers striking additional keys on a conventional keyboard.

Figure 5:
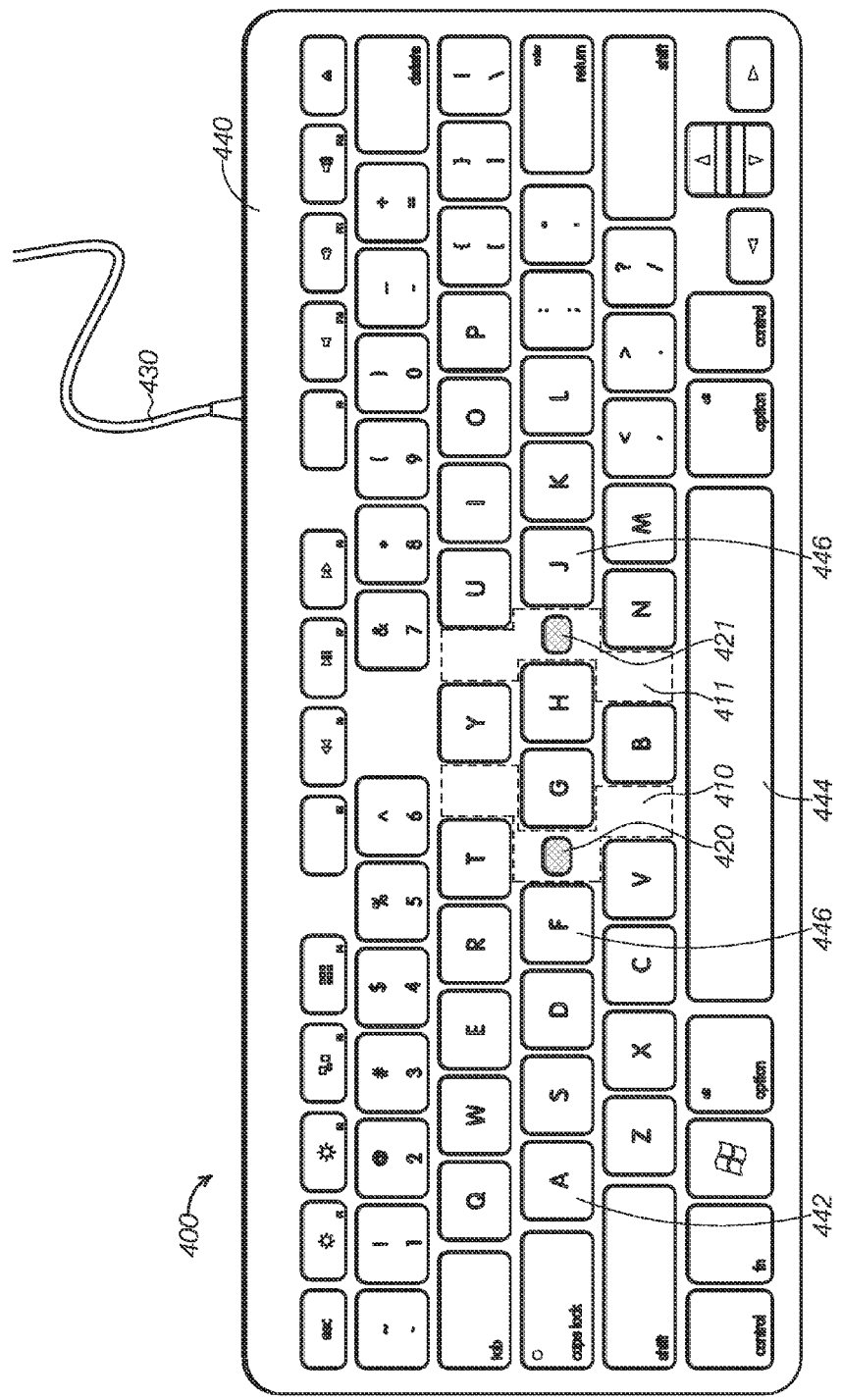
FIG. 5 is a plan view of a fourth embodiment of the thumbs-free computer keyboard with input devices between keys F and G and between the H and J keys.

Turning to FIGS. 5 through 6, a fourth embodiment of a thumbs-free computer keyboard 400 will now be described. Thumbs-free computer keyboard 400 share many similarities and identical features with the previously disclosed example. Thus, for the sake of brevity, each feature of thumbs-free computer keyboard 400, will not be described redundantly in great detail.

Thumbs-free computer keyboard 400, like thumbs-free computer keyboard 100, is derived from a conventional QWERTY keyboard. Thumbs-free computer keyboard 400 and 500 retains the same letters, symbols, numbers, and command keys order as a conventional QWERTY keyboard. Thumbs-free computer keyboard 400 includes increased spaces 410 and 411, in the vicinity of the index finger locations when the user's fingers are in neutral position. FIG. 5 shows increased space 410 for the user's left and right hands in between keys T, Y, G, B, V, and F for the left hand and increased space 411 located between the Y, U, J, N, B, and H keys for the right hand.

Figure 6A:
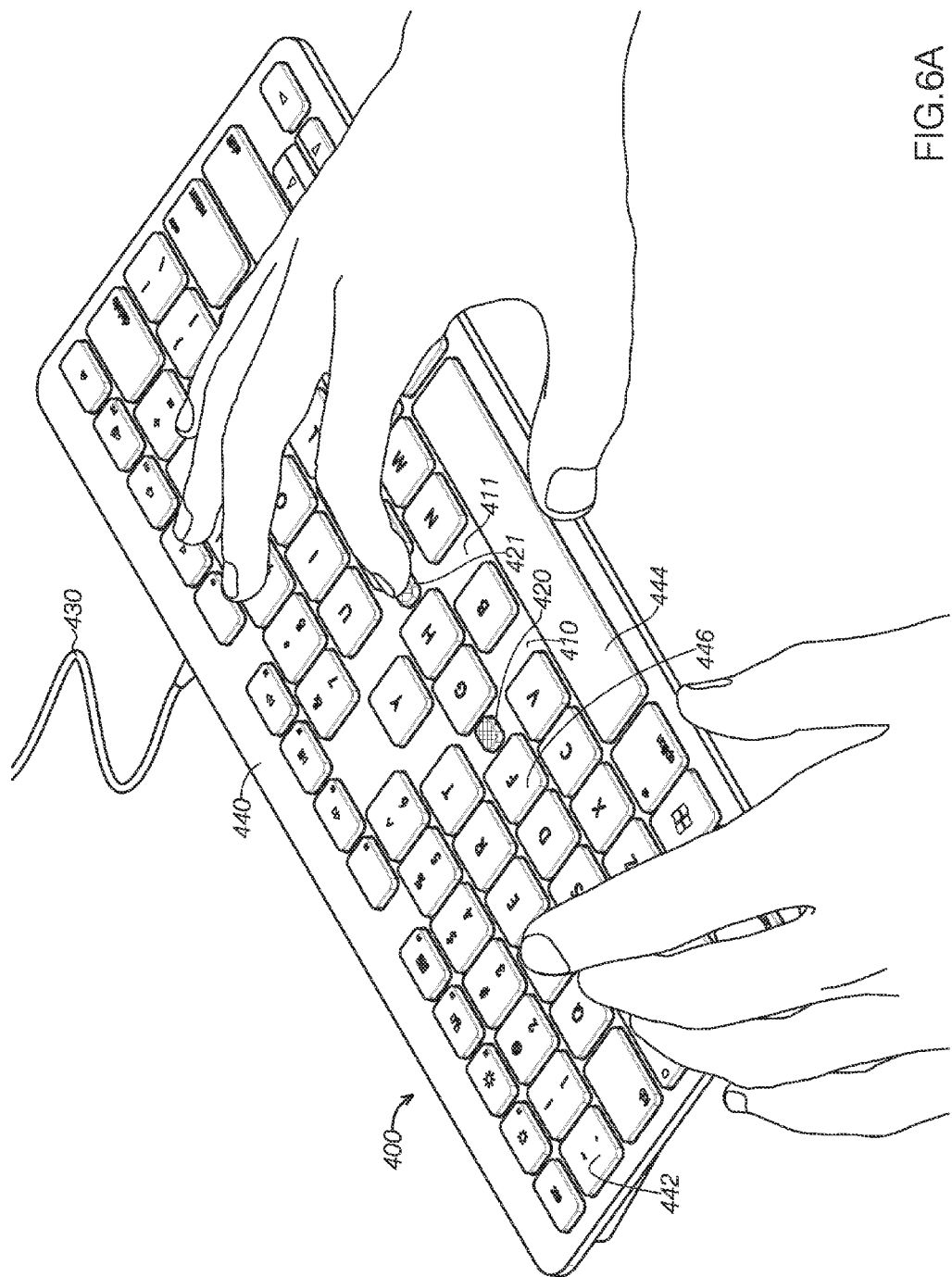
FIG. 6A is a perspective of fourth embodiment of the thumbs-free computer keyboard showing a user activating the input device with his right index finger.
Figure 6B:
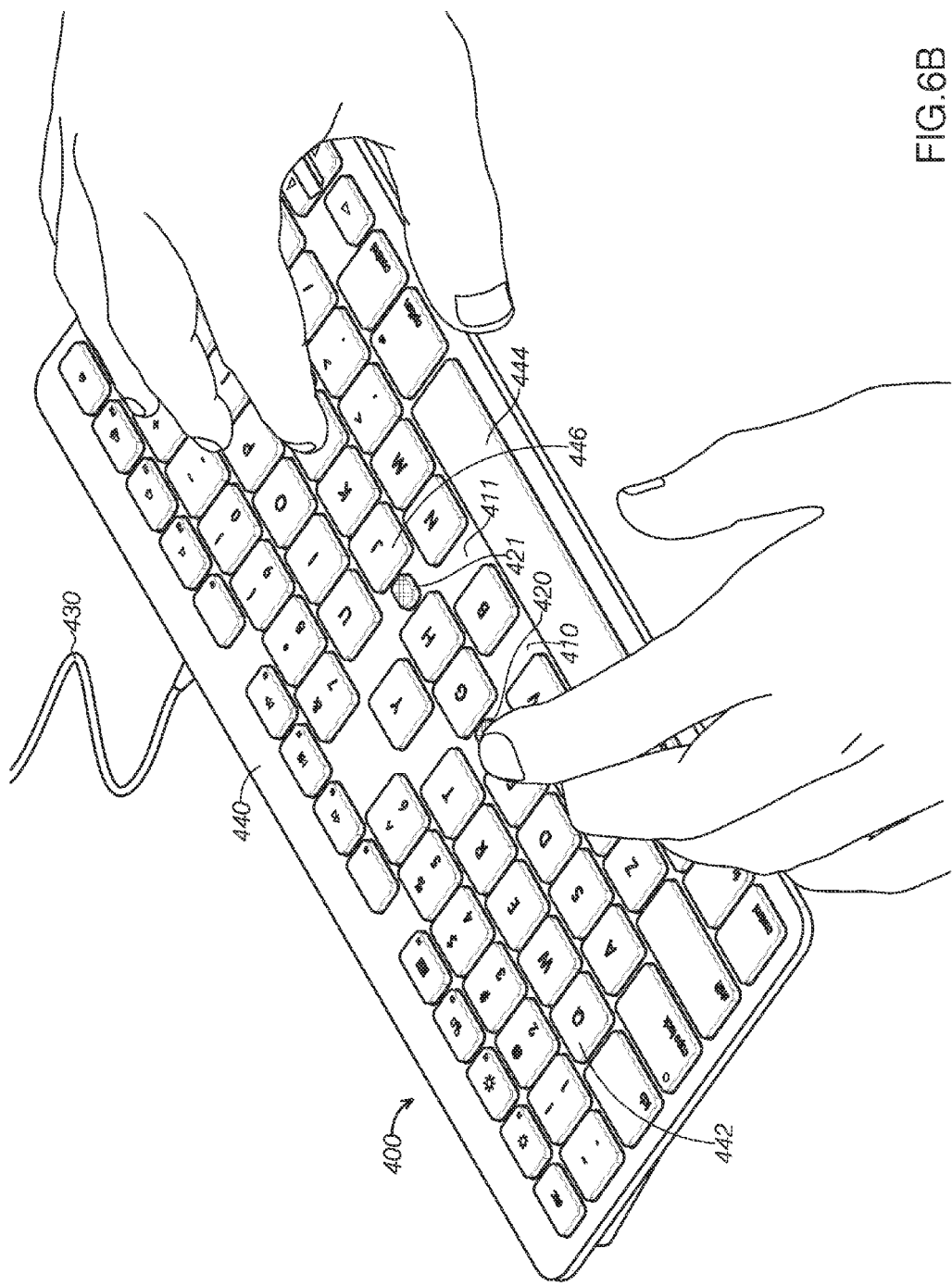
FIG. 6B is a perspective of the fourth embodiment of the thumbs-free computer keyboard showing a user activating the input device with his left index finger.

Unlike thumbs-free computer keyboard 100, thumbs-free computer keyboard 400 has two input devices 420 and 421. Two input devices have the advantage that a user's index fingers do not have to reach as far from neutral position to actuate the space bar function. FIGS. 6A and 6B of thumbs-free keyboard 400, shows input device 420 located between keys F and G for the left hand, and input device 421 located between keys H and J for the right hand, respectively. From FIGS. 6A and 6B, one can see that a user can easily choose to use either left or right index fingers to activate input devices 420 and 421.

Figure 7:
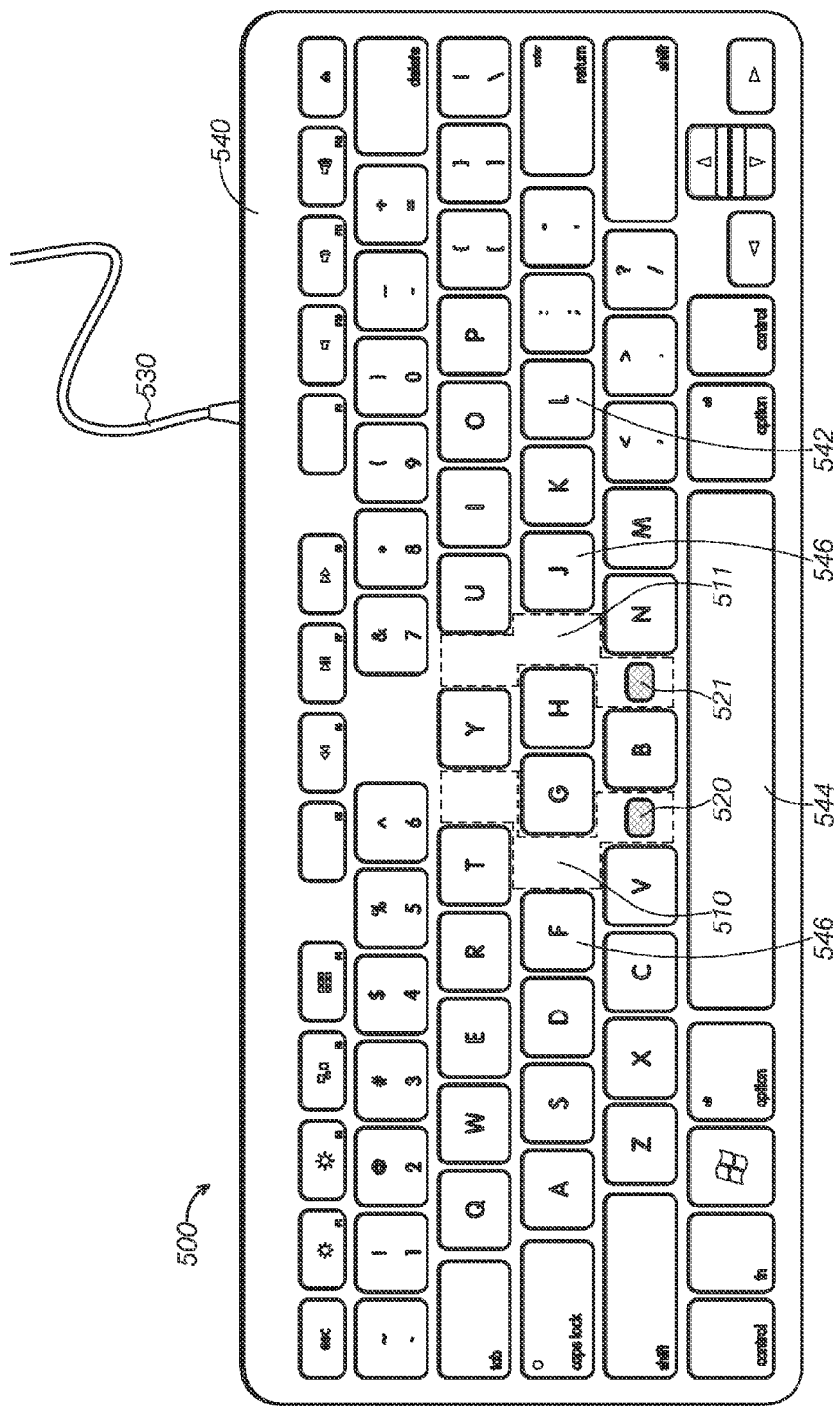
FIG. 7 is a plan view of a fifth embodiment of the thumbs-free computer keyboard with input devices between keys V and B and between keys B and N.

Turning now to FIG. 7, a fifth embodiment of a thumbs-free computer keyboard, thumbs-free computer keyboard 500, is shown. Thumbs-free computer keyboard 500 has increased spaces 510 and 511 located in a similar arrangement as thumbs-free computer keyboard 400. In contrast to thumbs-free computer keyboard 400, thumbs-free computer keyboard 500 includes input devices 520 and 521 in a different location in increased spaces 510 and 511, where input device 520 is between keys V and B for the left hand and input device 521 is between keys B and N for the right hand. In other examples, one input device may be located between keys T and Y or the V and B keys for the left and the Y and U keys or the B and N keys for the right hand.

Figure 8:
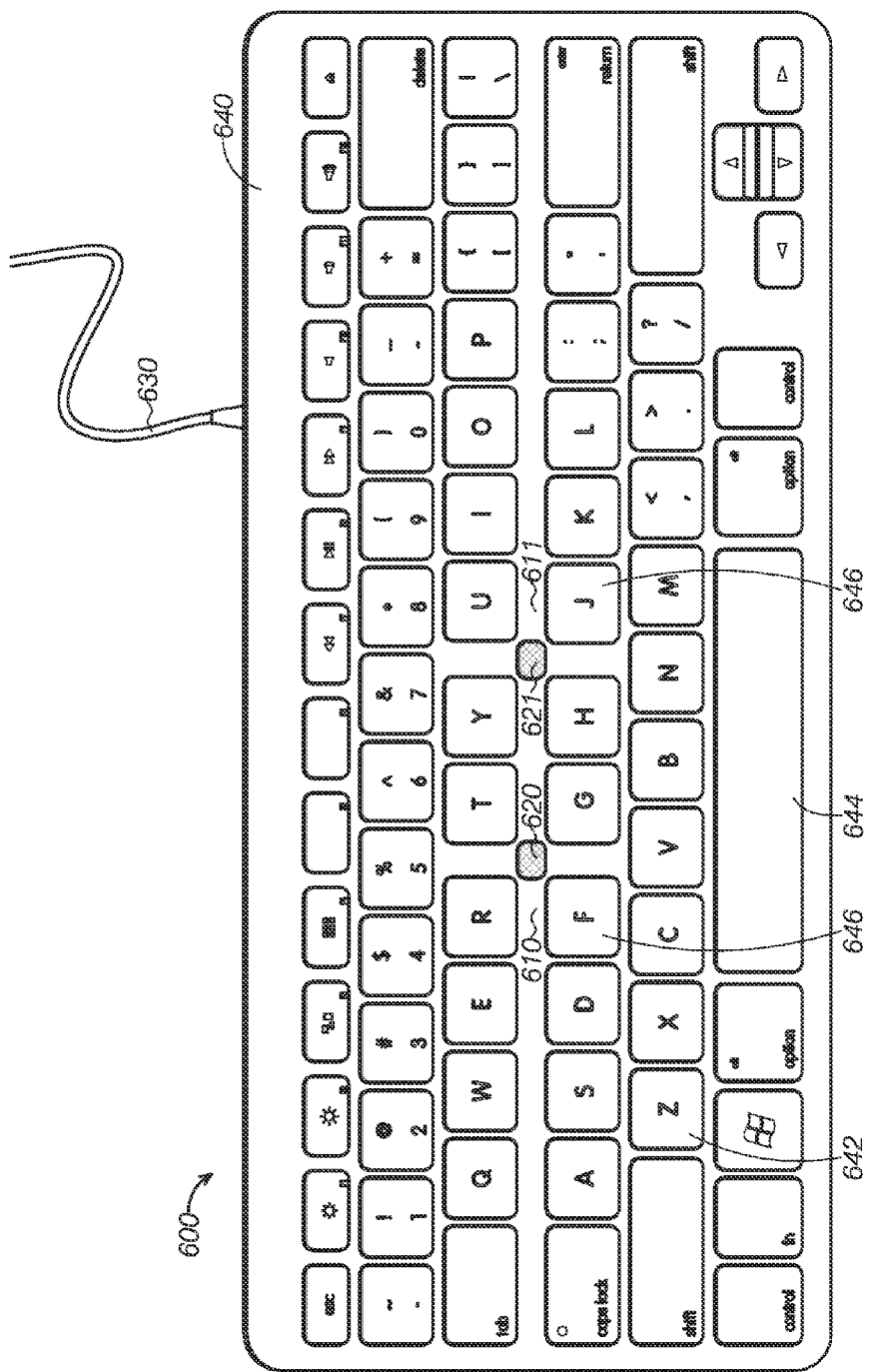
FIG. 8 is a plan view of a sixth embodiment of the thumbs-free computer keyboard with input devices between the R, T, G, and F keys and between the Y, U, J, and H keys.
Figure 9A:
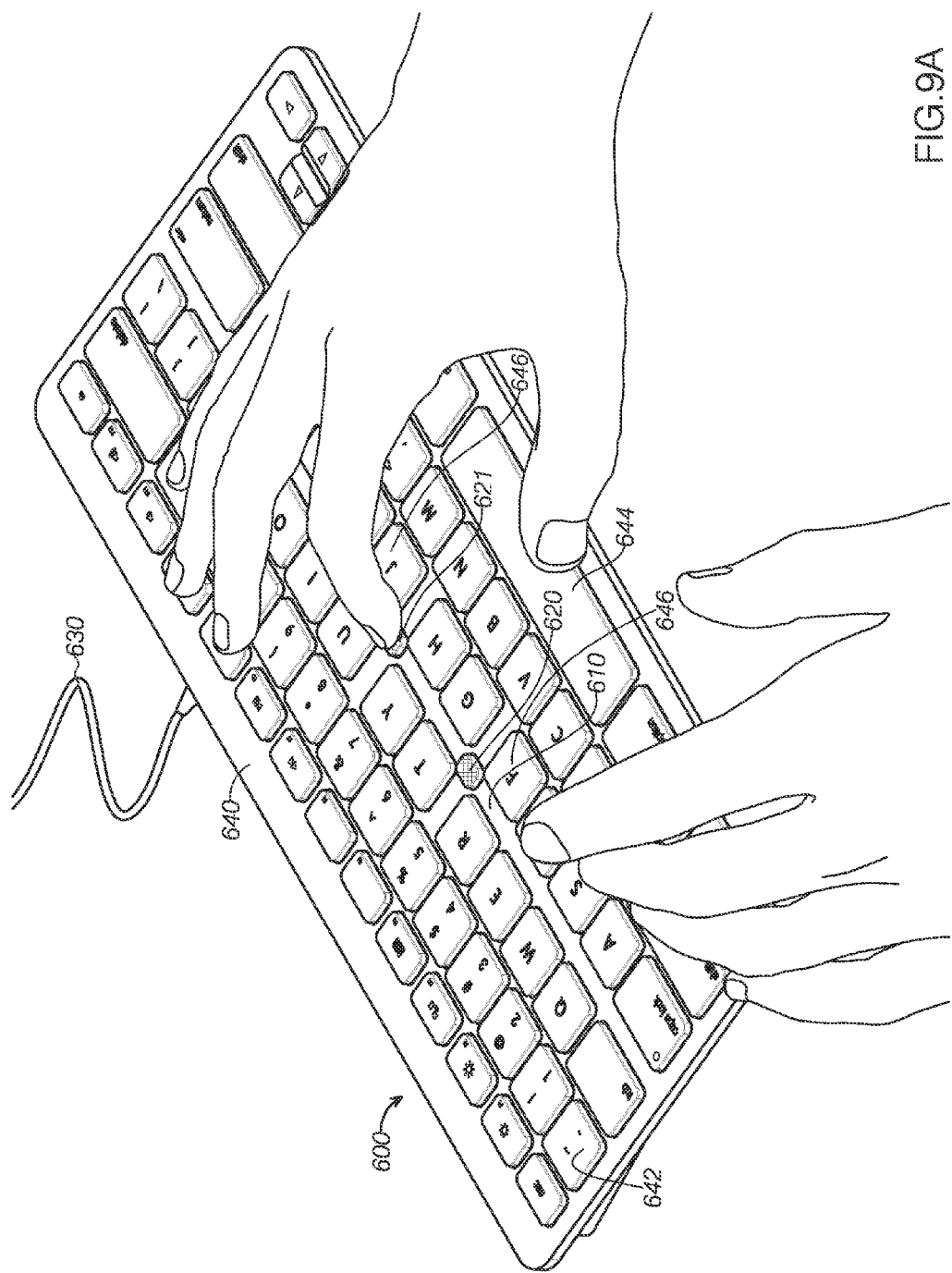
FIG. 9A is a perspective of the sixth embodiment of the thumbs-free computer keyboard showing a user activating the input device with his right hand.
Figure 9B:
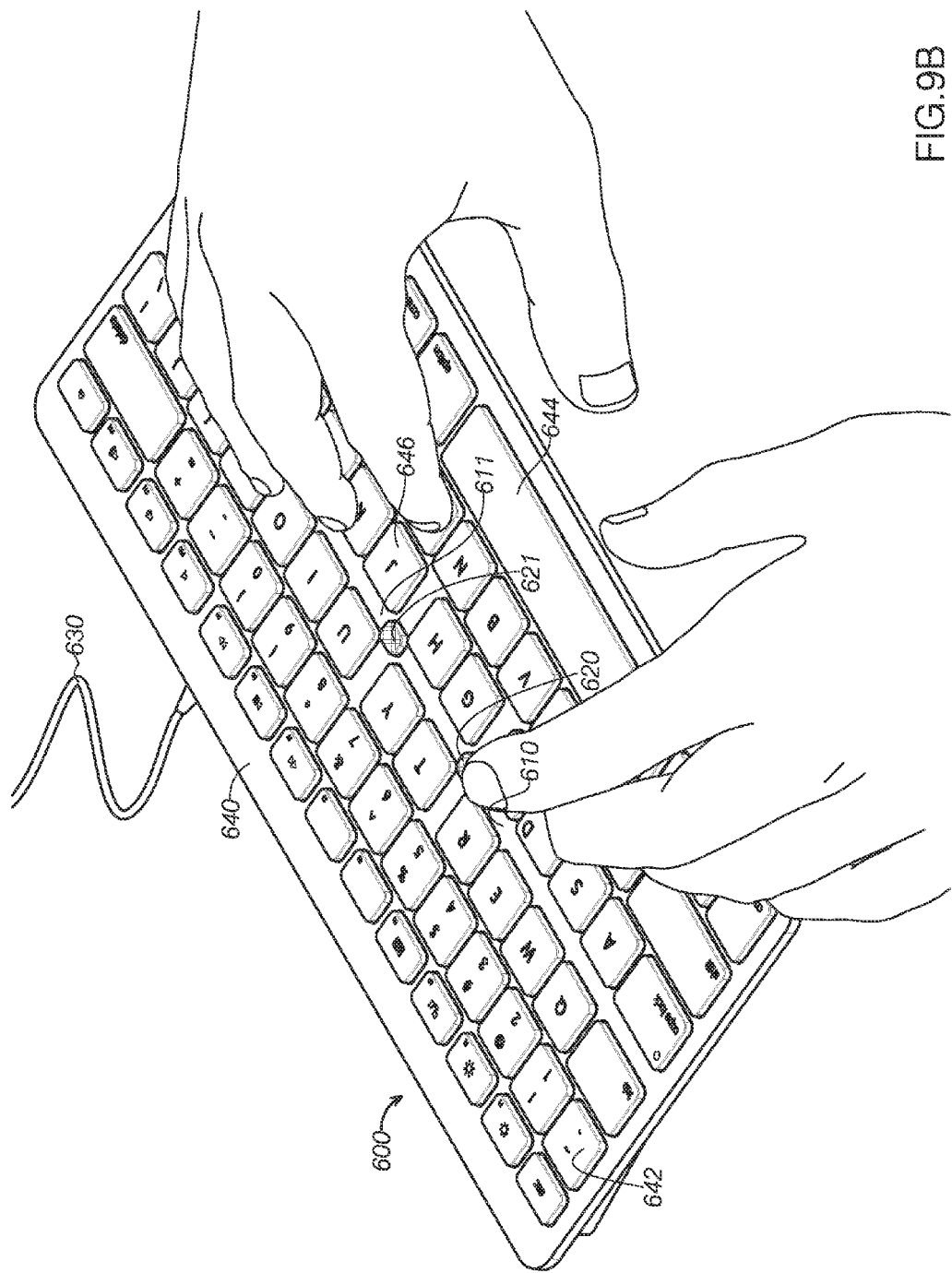
FIG. 9B is a perspective of the sixth embodiment of the thumbs-free computer keyboard showing a user activating the input device with his left hand.
Figure 10:
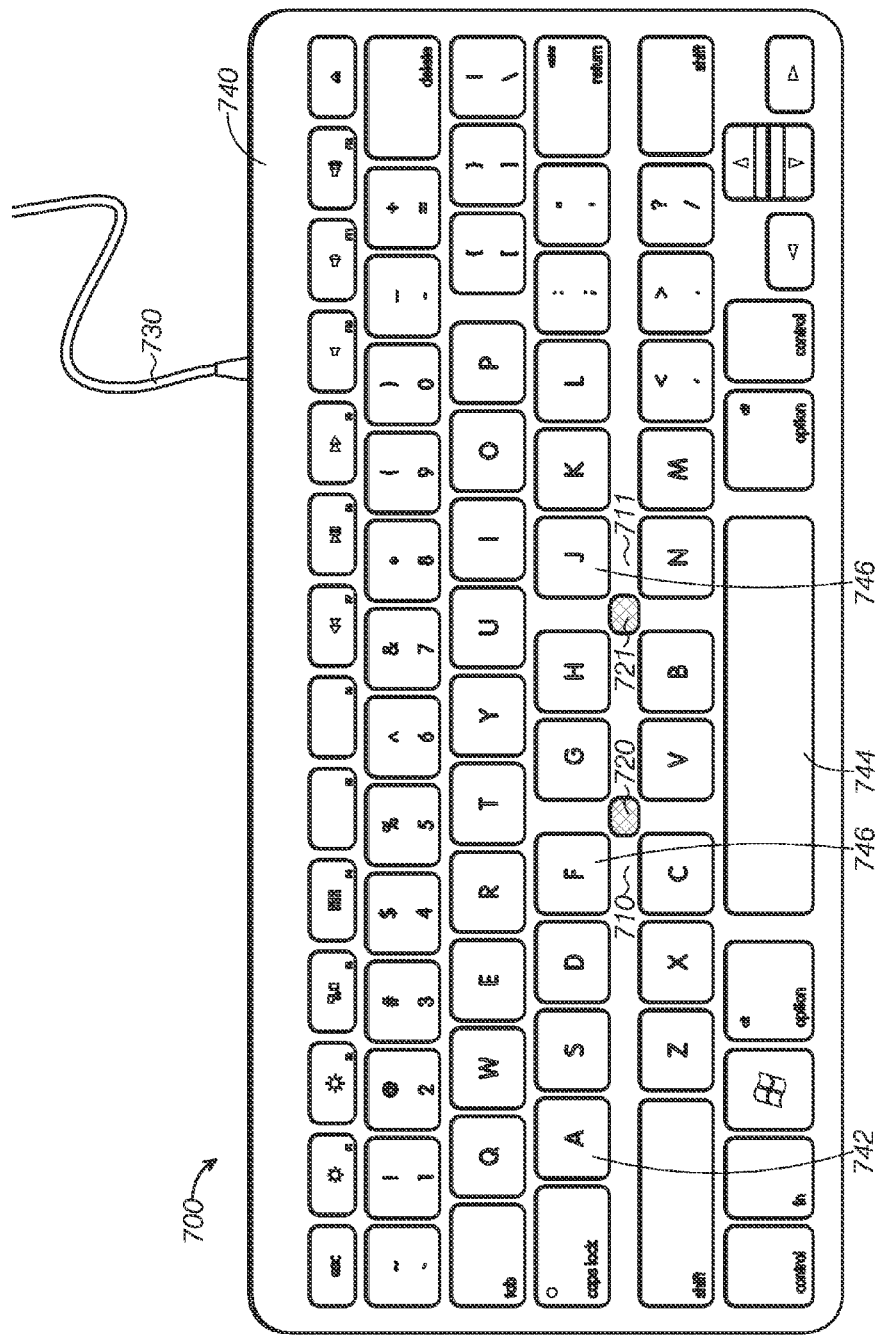
FIG. 10 is a plan view of a seventh embodiment of the thumbs-free computer keyboard with input devices between F, G, V, and C keys and between the H, J, M, and N keys.

Turning to FIGS. 8 and 10, a sixth embodiment of a thumbs-free computer keyboard, thumbs-free computer keyboard 600, will now be described. Thumbs-free computer keyboard 600 shares many similarities and identical features with the previously disclosed example. Thus, for the sake of brevity, each feature of thumbs-free computer keyboard 600, will not be described redundantly in great detail.

Similar to thumbs-free keyboards 400 and 500, thumbs-free computer keyboard 600, includes two input devices 620 and 621. Thumbs-free computer keyboard 600 includes increased space 610 and increased space 611 that are configured to contain one input device each. Increased space 610 is proximate to the neutral index finger position for the left hand and is located between keys R, T, G, V, C, and F. Increased space 611 is proximate to the neutral index finger position for the right hand and is located between keys Y, U, J, M, N, and H.

Input devices 620 and 621 may be used to actuate the space bar function. Input devices 620 and 621 are symmetrically located within increased spaces 610 and 611, respectively. Input device 620 is disposed within increased space 610 at the center space of keys R, T, G, and F for the left hand, while input device 621 is disposed at the center space of keys Y, U, J, and H for the right hand.

Alternatively as shown in FIG. 10, a seventh embodiment of thumbs-free computer keyboard, thumbs-free computer keyboard 700, is shown. Thumbs-free computer keyboard 700 has increased spaces 710 and 711 in the same location as increased spaces 610 and 611 of the sixth embodiment. Thumbs-free computer keyboard 700 also has two input devices 720 and 721. Input device 720 is located within increased space 710 at the center of keys F, G, V, and C for the left hand. Input device 721 is positioned within increased space 711 at the center of keys H, J, N, and B for the right hand. In other examples, the first input device may be located between keys C and V for inputting a space bar function with the left hand and a second input device may be located between keys N and B for input from the right hand.

Input devices 420, 421, 520, 521, 620, 621, 720, and 721 share essentially the same features as input devices 120. In the examples shown in FIG. 5-10, input devices 420, 421, 520, 521, 620, 621, 720, and 721 are depressible keys substantially the same as the other keys, 442, 542, 642, and 742, of thumbs-free computer keyboards. In other examples, the input devices of thumbs-free computer keyboards 400, 500, 600 and 700 may be of the same size and shape or have different size or shape than depressible keys 442, 542, 642, and 742. Also, the input devices of thumbs-free computer keyboards 400, 500, 600 and 700 may have a smooth surface or a textured surface. Next, the input devices of thumbs-free computer keyboards 400, 500, 600 and 700 may include any number of combinations of size, shape and texture different from the size, shape and surface texture as depressible keys 442, 542, 642, and 742. Alternatively, the input devices of thumbs-free computer keyboards 400, 500, 600 and 700 may also be a touchpad or a motion sensor that detects certain motions or series of motion that communicates to the computer that a space bar function is sought.

Finally, it should be noted that the thumbs-free keyboards disclosed above may also take the form of non-traditional keyboards. The described keyboards may be configured as ergonomic keyboards, split keyboards, or any alternatively-arranged keyboard that requires a user to actuate the space bar command with his thumbs.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A computer keyboard configured for thumbs-free user input, comprising:
   circuitry configured to detect user input to the computer keyboard and to communicate data corresponding to the user input to a computer;
   a body housing the circuitry;
   a series of depressible keys supported by the body and in data communication with the circuitry, the depressible keys including letter keys in a modified QWERTY configuration and positioned for a user to depress the depressible keys with his fingers other than his thumbs, the modified QWERTY configuration being characterized by increased space between the G and H keys than with a conventional QWERTY keyboard; and
   an input device disposed in the increased space between the G and H keys and configured for a user to engage without using his thumbs;
   wherein engaging the input device causes the circuitry to communicate a space command to the computer analogously to engaging the space bar in a conventional QWERTY keyboard.

2. The computer keyboard of claim 1, wherein the input device is an additional depressible key that the user engages by pressing.

3. The computer keyboard of claim 1, wherein the input device is a motion sensor that detects a pre-chosen finger motion of the user to be engaged.

4. The computer keyboard of claim 3, wherein the pre-chosen finger motion is a swipe, a tap, or a series of taps.

5. The computer keyboard of claim 1, wherein the input device is a touchpad that detects pre-chosen finger motion of the user to be engaged.

6. The computer keyboard of claim 1, wherein:
   the series of depressible keys includes a space bar, the circuitry configured to communicate a space command to the computer when the space bar is depressed;
   the circuitry is programmed to selectively stop communicating the space command to the computer when the space bar is depressed.

7. A computer keyboard configured for thumbs-free user input, comprising:
   circuitry configured to detect user input to the computer keyboard and to communicate data corresponding to the user input to a computer;
   a body housing the circuitry;
   a series of depressible keys supported by the body and in data communication with the circuitry, the depressible keys including letter keys in a modified QWERTY configuration and positioned for a user to depress the depressible keys with his fingers other than his thumbs, the modified QWERTY configuration including index finger keys positioned to be engaged by the user's index fingers, the conventional index finger keys being spaced farther apart than keys corresponding to the index finger keys in a traditional QWERTY keyboard are spaced; and
   two input keys disposed in an increased space in the vicinity of the index finger keys and configured for a user to engage without using his thumbs; the two input keys being reachable by respective index fingers of the user when the hands of the user are in a neutral position on the modified QWERTY configuration;
   wherein engaging the input keys causes the circuitry to communicate a space command to the computer analogously to engaging the space bar in a conventional QWERTY keyboard.

8. A computer keyboard of claim 7, wherein the input keys are located in the increased spaces; and
   wherein the increased space is situated between keys T, Y, G, B, V and F for the left hand and between keys Y, U, J, N, B, and H for the right hand.

9. A computer keyboard of claim 7, wherein the input keys are located in the increased space between letter keys F and G for use with the left hand of the user and in the increased space between letter keys H and J for use with the right hand of the user.

10. A computer keyboard of claim 7, wherein the space bar function can be actuated by the conventional space bar or be switched to the two input keys.

11. A computer keyboard of claim 7, wherein the size and shape of the input keys includes any shape or size that could be accommodated by the increased space between the conventional letter keys.

12. A computer keyboard of claim 7, wherein the keyboard is larger to accommodate the increased space needed for the input keys.

13. A computer keyboard configured for thumbs-free user input, comprising:
    circuitry configured to detect user input to the computer keyboard and to communicate data corresponding to the user input to a computer;
    a body housing the circuitry;
    a series of depressible keys supported by the body and in data communication with the circuitry, the depressible keys including letter keys in a modified QWERTY configuration and positioned for a user to depress the depressible keys with his fingers other than his thumbs, the modified QWERTY configuration including:
        a first input device centrally disposed between the R-T-G-F block of keys; and
        a second input device centrally disposed between the Y-U-J-H block of keys;
    wherein the first input device and the second input device are configured for a user to engage without using his thumbs;
    wherein engaging either of the input devices causes the circuitry to communicate to a space command to the computer analogously to engaging the space bar in a conventional QWERTY keyboard.

14. The computer keyboard of claim 13, wherein the first input device and the second input device are depressible keys.

15. The computer keyboard of claim 14, wherein the increased space is proportionately larger to accommodate the shape and size of the two input devices.

16. The computer keyboard of claim 13, wherein the first input device and the second input device are motion sensors that detect a pre-chosen motion from the finger of the user and communicating to the computing device that a space command is sought.

17. The computer keyboard of claim 16, wherein the pre-chosen motion over the motion sensor indicating that a space command is sought, is a swipe of the finger of the user, or a tap, or a series of taps.

18. The computer keyboard of claim 13, wherein the first input device and the second input device are touchpads that recognize a pre-chosen motion from the finger of the user and communicating to the computing device that a space command is sought.

19. The computer keyboard of claim 18, wherein the pre-chosen motion over the touchpad indicating that a space command is sought, is a swipe of the finger of the user, or a tap, or a series of taps.

20. The computer keyboard of claim 13, wherein the user may switch the space bar function from being actuated by the conventional keyboard space bar present, to being activated by the two input devices.

* * * * *